United States Patent
Liao et al.

(10) Patent No.: US 9,993,963 B2
(45) Date of Patent: Jun. 12, 2018

(54) INKJET CHIP AND CONTROL CIRCUIT OF PRINTING MODULE OF RAPID PROTOTYPING APPARATUS

(71) Applicant: MICROJET TECHNOLOGY CO., LTD, Hsinchu (TW)

(72) Inventors: Wen-Hsiung Liao, Hsinchu (TW); Chi-Feng Huang, Hsinchu (TW)

(73) Assignee: MICROJET TECHNOLOGY CO., LTD, Hsinchu (TW)

( * ) Notice: Subject to any disclaimer, the term of this patent is extended or adjusted under 35 U.S.C. 154(b) by 401 days.

(21) Appl. No.: 14/995,836

(22) Filed: Jan. 14, 2016

(65) Prior Publication Data
US 2016/0207264 A1    Jul. 21, 2016

(30) Foreign Application Priority Data
Jan. 16, 2015 (TW) .............................. 104101600 A

(51) Int. Cl.
*B29C 64/112* (2017.01)
*B41J 2/14* (2006.01)
(Continued)

(52) U.S. Cl.
CPC .......... *B29C 64/112* (2017.08); *B29C 64/386* (2017.08); *B41J 2/0458* (2013.01); *B41J 2/04528* (2013.01); *B41J 2/04541* (2013.01); *B41J 2/1404* (2013.01); *B41J 2/14145* (2013.01); *B41J 2/1752* (2013.01); *B41J 2/1753* (2013.01); *B41J 2/17513* (2013.01); *B41J 2/17546* (2013.01); *B41J 2/17553* (2013.01);
(Continued)

(58) Field of Classification Search
CPC .. B29C 64/112; B29C 64/386; B41J 2/04541; B41J 2/0458; B41J 2/1404
See application file for complete search history.

(56) References Cited

U.S. PATENT DOCUMENTS 9,221,253 B2 * 12/2015 Suzuki ................ B41J 2/04588
9,776,408 B2 * 10/2017 Bibl ....................... B41J 2/1433
(Continued)

FOREIGN PATENT DOCUMENTS

CN        201685457        12/2010
EP         1440807          7/2004
(Continued)

*Primary Examiner* — Lamson Nguyen
(74) *Attorney, Agent, or Firm* — Kirton McConkie; Evan R. Witt

(57) ABSTRACT

An inkjet chip of printing module of a rapid prototyping apparatus and a control circuit thereof are disclosed. The inkjet chip has a length and a width to define a total area including an unwiring area and a wiring area. The unwiring area has at least three liquid supply slots in parallel with each other and respectively connected to one of the ink chambers of the modular ink cartridge. The wiring area has a control circuit. The control circuit includes a plurality of liquid ejectors. Each liquid ejector has a heating resistor, a driving transistor, and a nozzle. The control circuit is connected to receive a power signal, a printing data signal, a preheating data signal, a preheating control signal, a reverse preheating control signal, a heating control signal, and a reverse heating control signal and connected with the common connection node for controlling the liquid ejector.

14 Claims, 14 Drawing Sheets

(51) Int. Cl.
| | |
|---|---|
| *B41J 2/045* | (2006.01) |
| *B41J 2/175* | (2006.01) |
| *B41J 29/02* | (2006.01) |
| *B29C 64/386* | (2017.01) |
| *B33Y 50/02* | (2015.01) |
| *B33Y 30/00* | (2015.01) |

(52) U.S. Cl.
CPC ............... *B41J 29/02* (2013.01); *B33Y 30/00* (2014.12); *B33Y 50/02* (2014.12)

(56) References Cited

U.S. PATENT DOCUMENTS

| | | | |
|---|---|---|---|
| 9,814,098 B2* | 11/2017 | Gruenbacher | ....... H05B 1/0244 |
| 2004/0201639 A1 | 10/2004 | Hayasaki | |
| 2005/0174401 A1 | 8/2005 | Jung et al. | |
| 2011/0300248 A1 | 12/2011 | Tung et al. | |

FOREIGN PATENT DOCUMENTS

| | | |
|---|---|---|
| EP | 1533121 | 5/2005 |
| JP | 60-94356 | 5/1985 |
| KR | 10-2005-0079494 | 8/2005 |
| KR | 10-2006-0109421 | 10/2006 |
| TW | 200840720 | 10/2008 |
| TW | 201238780 | 10/2012 |

\* cited by examiner

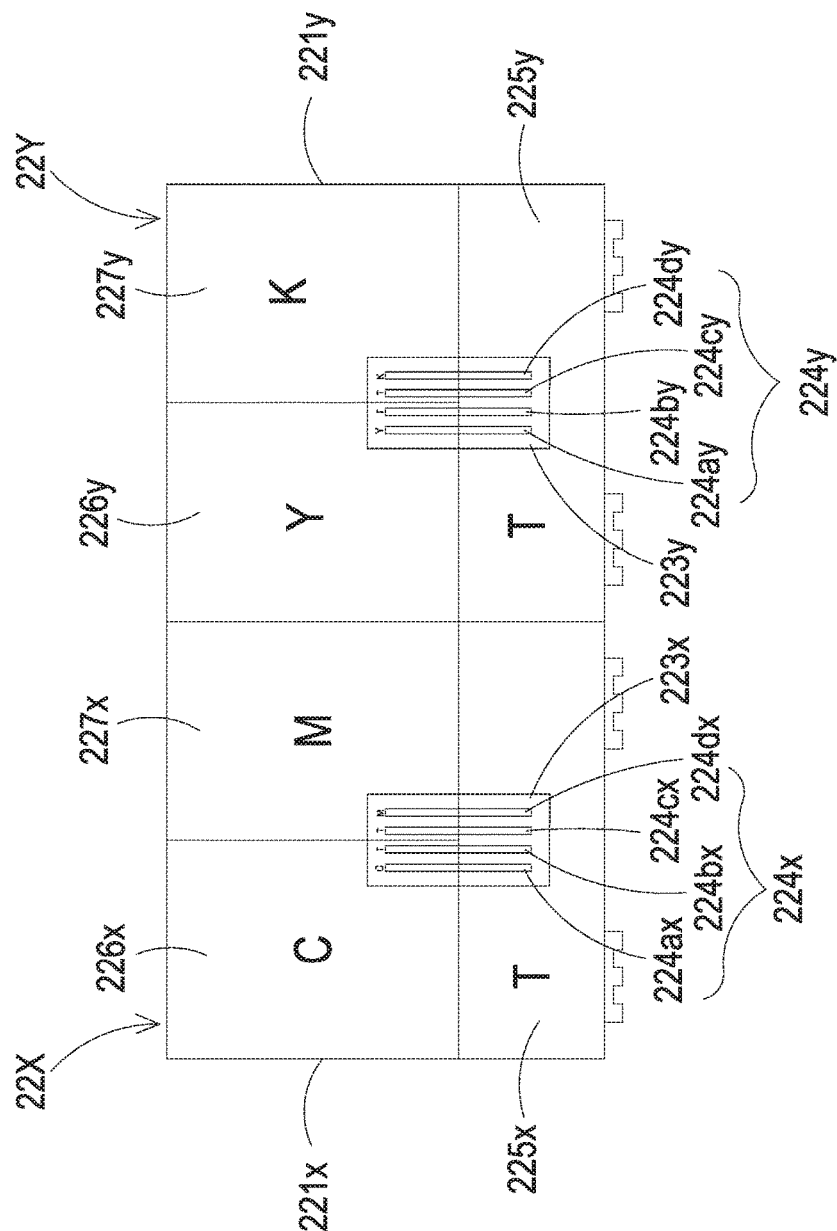

INKJET CHIP AND CONTROL CIRCUIT OF PRINTING MODULE OF RAPID PROTOTYPING APPARATUS

FIELD OF THE INVENTION

The present invention relates to an inkjet chip and control circuit thereof, and more particularly to an inkjet chip of a printing module of a rapid prototyping apparatus and a control circuit thereof.

BACKGROUND OF THE INVENTION

As known, the rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining an inkjet printing technology and a precise positioning technology of positioning the carriers. The producing method begins by first spreading a layer of powder on the carrier and then printing high viscosity liquid binder on part of the powder by using the inkjet printing technology, so that the liquid binder and the powder stick together to become solidified. A three-dimensional physical model is produced by above steps being repeated to stack up multiple layers.

Conventionally, a printing module using the general inkjet printing technology and the rapid prototyping technology are collaboratively used to produce the three-dimensional physical model. FIG. 1 schematically illustrates the architecture of a printing module using the general inkjet printing technology according to the prior art. As shown in FIG. 1, the printing module 1 using the general inkjet printing technology is installed on a main body (not shown) in order to perform an inkjet printing operation. The printing module 1 comprises an inkjet printing platform 10, a carrying seat 11 and at least one ink cartridge 12. The inkjet printing platform 10 comprises a bracket 101 and a transmission shaft 102. The transmission shaft 102 is spanned across the bracket 101. The carrying seat 11 is sheathed around the transmission shaft 102. The at least one ink cartridge 12 includes two ink cartridges, as shown in FIG. 1. black ink is contained in a first ink cartridge 121 and color inks (for example cyan (C) ink, yellow (Y) ink, magenta (M) ink) are contained in a second ink cartridge 122. The at least one ink cartridge 12 is installed on the carrying seat 11. Consequently, the carrying seat 11 and the at least one ink cartridge 12 thereon can be moved relative to the transmission shaft 102 of the inkjet printing platform 10 along the X-axis in a reciprocating motion.

When the printing module 1 performs the inkjet printing operation according to the RP technology, the carrying seat 11 and the at least one ink cartridge 12 thereon are driven by the inkjet printing platform 10 and thus moved along the Y-axis in a reciprocating motion. Moreover, the carrying seat 11 and the at least one ink cartridge 12 are moved relative to the transmission shaft 102 of the inkjet printing platform 10 from left to right and from right to left along the X-axis in the reciprocating motion. As the reciprocating motions along the X-axis and the Y-axis are alternately performed, the color inks contained in the ink cartridge 12 are printed on a construction material (not shown), which is spread by a construction platform (not shown). A three-dimensional physical model is produced by above steps being repeated to stack up multiple layers.

However, when the inkjet printing operation is performed according to the RP technology, the ink cartridge 12 has to contain not only the black ink and the color ink but also the high-viscosity liquid binder in order to adhere the construction material and produce the three-dimensional physical model by stacking multiple layers. Hence, in the conventional inkjet printing method of the rapid prototyping apparatus, extra carrying seat and ink cartridge have to be employed for containing the high-viscosity liquid binder. Consequently, the entire size of the printing module 1 will be increased, and the cost of the carrying seat and the ink cartridge will be increased.

Therefore, there is a need of providing an inkjet chip of a printing module of a rapid prototyping apparatus and a control circuit thereof in order to overcome the drawbacks encountered by the prior arts.

SUMMARY OF THE INVENTION

An object of the present invention provides an inkjet chip of a printing module of a rapid prototyping apparatus. The inkjet chip includes a plurality of liquid ejectors arranged in plural rows and disposed in staggered arrangement, so as to facilitate the heating circuits of the liquid ejectors to be performed in high efficient operation.

Another object of the present invention provides an inkjet control circuit for an inkjet chip of a printing module of a rapid prototyping apparatus. When the print data signal and the heating control signal are at high voltage levels, the heating resistor heats a part of the print ink to generate a bubble and eject the print ink through the nozzle of the inkjet chip. Alternatively, when the print data signal is at low voltage level and the preheating control signal and the preheating data signal are at high voltage levels, the heating resistor preheats a part of the print ink and the inkjet chip. Consequently, the preheating temperature of the ink cartridge is controlled easily, and the preheating efficiency is enhanced.

In accordance with an aspect of the present invention, there is provided an inkjet chip used in a printing module of a rapid prototyping apparatus. The printing module includes a printing platform, a carrying seat and at least two modular ink cartridges. The at least two modular ink cartridges are disposed on the carrying seat. Each of the modular ink cartridges has a case body and three ink chambers. The three ink chambers are divided within the case body for receiving different print liquids, respectively, and the case bodies of the at least two modular ink cartridges contain at least one print liquid the same with each other. The inkjet chip is disposed on the bottom of the case body of the modular ink cartridge and has a length and a width to define a total area. The total area includes an unwiring area and a wiring area. The unwiring area has at least three liquid supply slots in parallel with each other and respectively connected to and in fluid communication with one of the three ink chambers of the modular ink cartridge. The wiring area has a control circuit. The control circuit includes a plurality of liquid ejectors, and each liquid ejector has a heating resistor, a driving transistor, and a nozzle. The heating resistors are disposed on the inkjet chip and sealed by a nozzle plate. The nozzles are disposed on the nozzle plate and corresponding to the heating resistors. The plural liquid ejectors are arranged along an axis and disposed at the bilateral sides of the corresponding liquid supply slot in staggered arrangement. The ratio of the wiring area of the inkjet chip to the total area of the inkjet chip is ranged from 85.03% to 94.65%.

In accordance with another aspect of the present invention, there is provided a control circuit. The control circuit is connected to receive a power signal, a printing data signal, a preheating data signal, a preheating control signal, a reverse preheating control signal, a heating control signal, and a reverse heating control signal and connected with a common connection node for controlling a liquid ejector. The heating resistor has an input terminal for receiving the power signal and an output terminal connected with an input terminal of the driving transistor. The driving transistor has an output terminal connected to the common connection node, and the driving transistor is controlled by the control circuit. The control circuit includes a first switch circuit, a second switch circuit, a third switch circuit, a fourth switch circuit, a fifth switch circuit, and a sixth switch circuit. The first switch circuit has an input terminal for receiving the power signal and a control terminal connected to the heating resistor. The second switch circuit has an input terminal for receiving the power signal, an output terminal connected to the heating resistor, and a control terminal connected to the output terminal of the first switch circuit. The third switch circuit has two control terminals for receiving the heating control signal and the print data signal respectively, an output terminal connected to the common connection node, and an input terminal connected to the input terminal of the first switch circuit and the control terminal of the second switch circuit. The fourth switch circuit has two control terminals connected to receive the preheating control signal and the preheating data signal respectively, an output terminal connected to the common connection node, and an input terminal connected to the input terminal of the first switch circuit, the control terminal of the second switch circuit and the input terminal of third switch circuit. The fifth switch circuit has two control terminals connected to receive the reverse heating control signal and the printing data signal, an output terminal connected to the common connection node, and an input terminal connected to the control terminal of the first switch circuit, the output terminal of the second switch circuit, and the control terminal of the liquid ejector. The sixth switch circuit has two control terminals connected to receive the reverse preheating control signal and the preheating data signal, an output terminal connected to the common connection node and an output terminal connected to the control terminal of the first switch circuit, the output terminal of the second switch circuit and the control terminal of the liquid ejector. When the preheating control signal and the preheating data signal are at high voltage levels and the reverse preheating control signal is at low voltage level, the sixth switch circuit is turned off, the second switch circuit is controlled by the output terminal of the first switch circuit and the fourth switch circuit is turned on, so that the power signal is transmitted to the heating resistor from the second switch circuit and the heating resistor preheats a part of the print ink and the inkjet chip. When the print data signal and the heating control signal are at high voltage levels and the reverse heating control signal is at low voltage level, the fifth switch circuit is turned off, the second switch circuit is controlled by the output terminal of the first switch circuit and the third switch circuit is turned on, so that the power signal is transmitted to the heating resistor from the second switch circuit and the heating resistor heats a part of the print ink to generate a bubble and eject the print ink through the nozzle of the inkjet chip.

The above contents of the present invention will become more readily apparent to those ordinarily skilled in the art after reviewing the following detailed description and accompanying drawings, in which:

FIG. 1 schematically illustrates the architecture of a printing module using the general inkjet printing technology according to the prior art;

FIG. 6 is a schematic view illustrating the ink cartridges of the printing module of the rapid prototyping apparatus according to the first embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
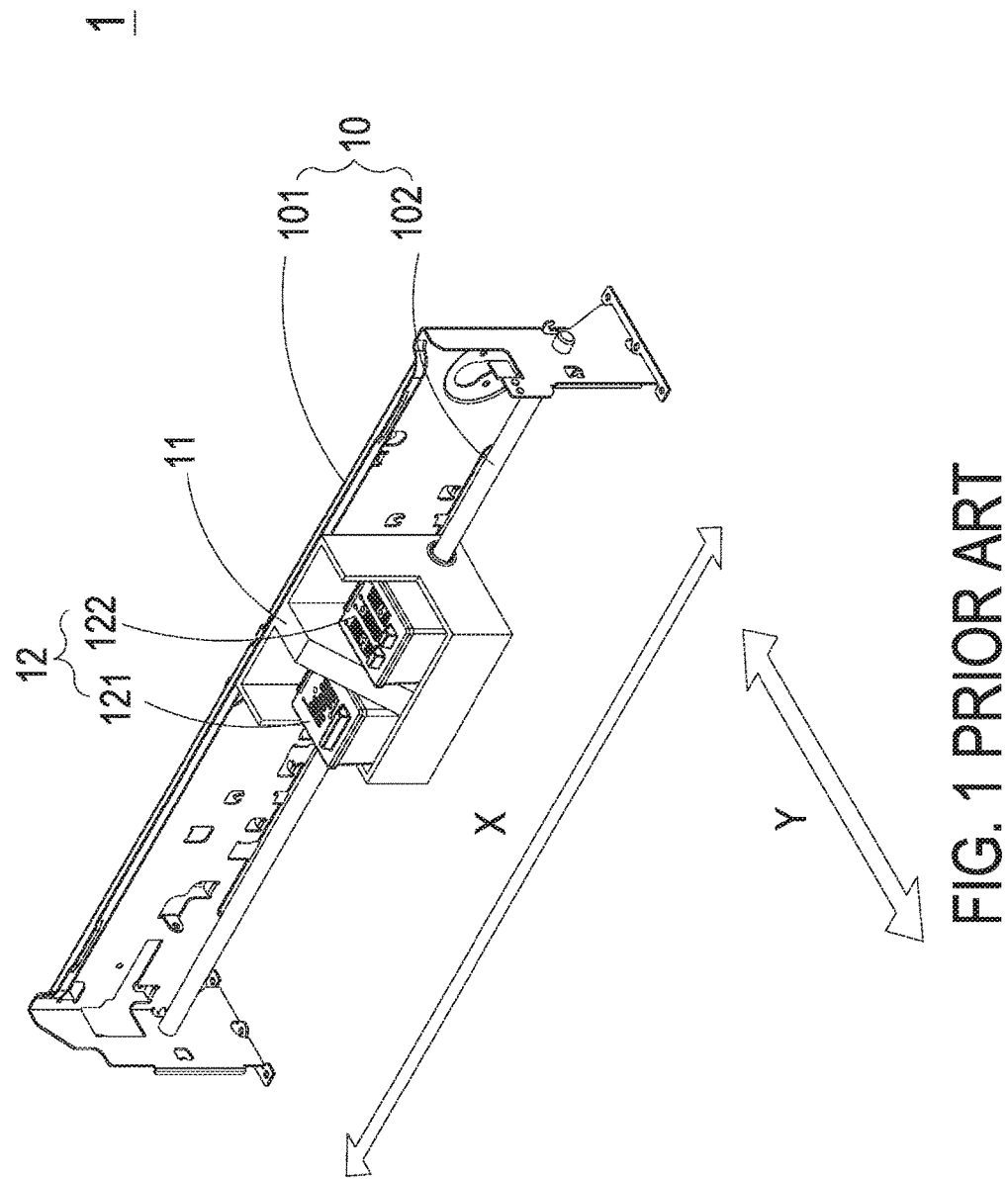
Figure 2:
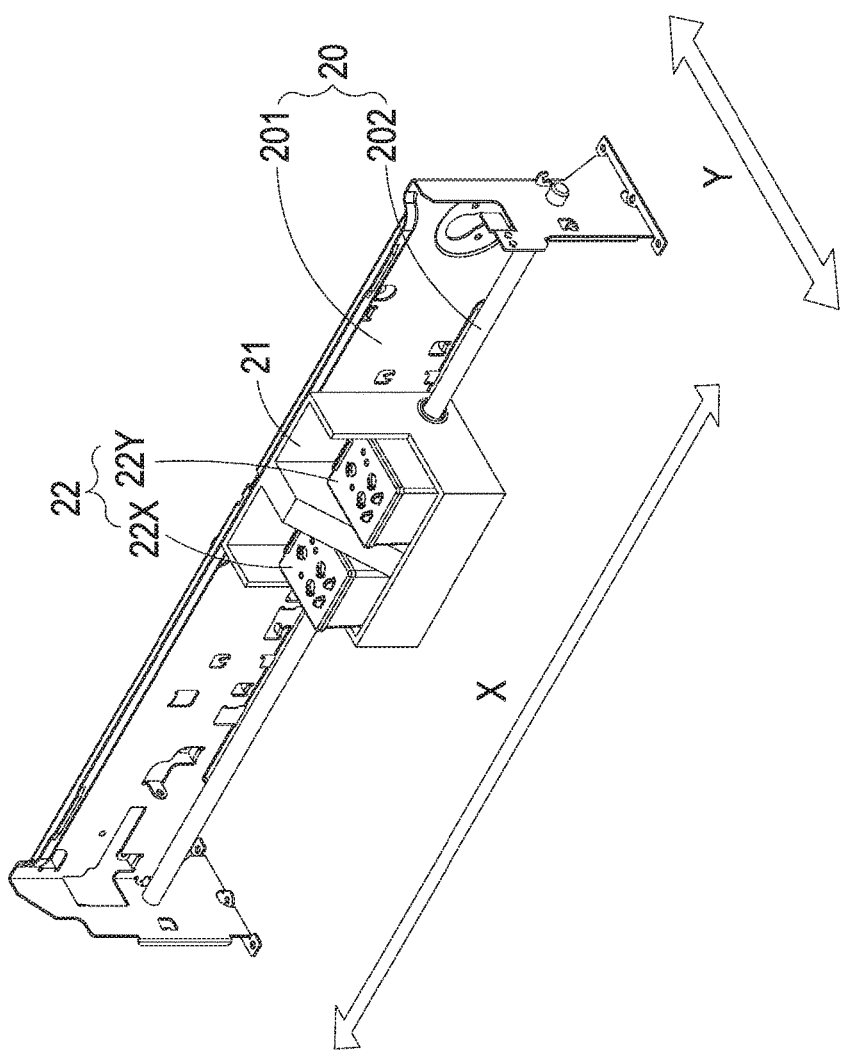
FIG. 2 is a schematic view illustrating a printing module of a rapid prototyping apparatus according to a first embodiment of the present invention.

FIG. 2 is a schematic view illustrating a printing module of a rapid prototyping apparatus according to a first embodiment of the present invention. As shown in FIG. 2, the printing module 2 is used in a rapid prototyping apparatus (not shown), and includes a printing platform 20, a carrying seat 21 and a plurality of modular ink cartridges 22 (hereinafter also referred to as ink cartridge). The printing platform 20 has a frame 201 and a driving shaft 202, and the driving shaft 202 is installed on the frame 201. The carrying seat 21 is penetrated and disposed on the driving shaft 202. In the embodiment, the plural ink cartridges 22 are two identical modular ink cartridges 22X, 22Y correspondingly disposed on the carrying seat 21. Consequently, the carrying seat 21 and the two ink cartridges 22X, 22Y thereon can be moved relative to the transmission shaft 202 of the inkjet printing platform 20 along a single axis (i.e. the X-direction) in a reciprocating motion. The print liquids are contained in plural ink cartridges 22 so as to perform the rapid prototyping printing process.

When the printing module 2 performs the inkjet printing operation according to the RP technology, the carrying seat 21 and the two ink cartridges 22X, 22Y thereon are driven by the inkjet printing platform 20 and thus moved along the Y-axis in a reciprocating motion. Moreover, the carrying seat 21 and the two ink cartridges 22X, 22Y are moved relative to the transmission shaft 202 of the inkjet printing platform 20 from left to right and from right to left along the X-axis in the reciprocating motion. As the reciprocating motions along the X-axis and the Y-axis are alternately performed, the print liquids contained in the two ink cartridges 22X, 22Y are printed on a construction material (not shown), which is spread by a construction platform (not shown). A three-dimensional physical model is produced by above steps being repeated to stack up multiple layers.

In some embodiments, the print liquid is a liquid binder or a color ink. An example of the color ink includes but is not limited to a pigment-based ink or a dye-based ink. In some embodiments, the print liquid is colorless or monochromatic. An example of the print liquid includes but is not limited to a transparent liquid binder, a cyan (C) print liquid, a yellow (Y) print liquid, a magenta (M) print liquid, a light cyan print liquid, a magenta print liquid or a grayscale print liquid.

Figure 3A:
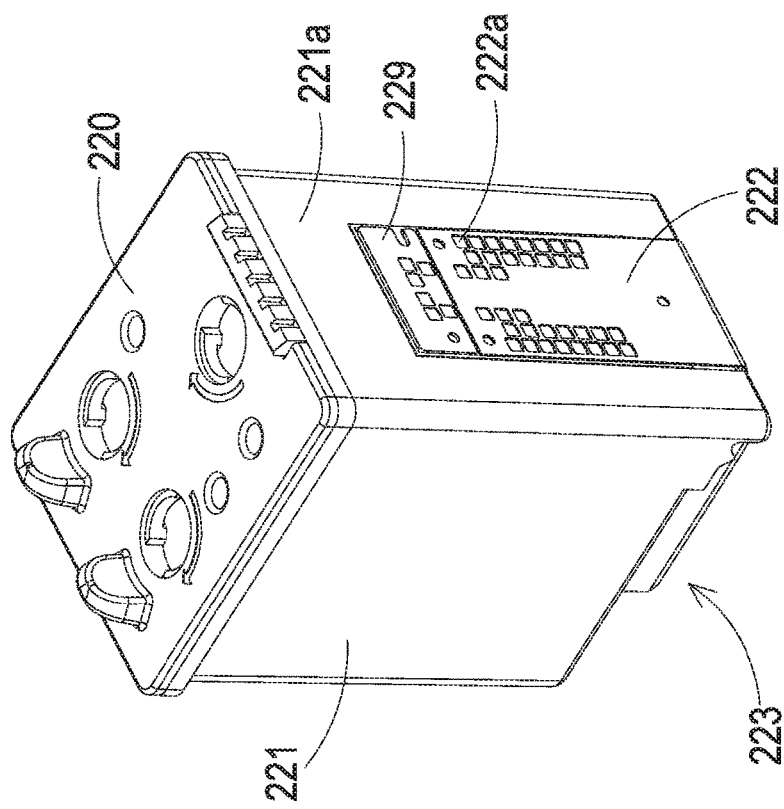
FIG. 3A is a schematic perspective view illustrating an ink cartridge of the printing module of the rapid prototyping apparatus according to the first embodiment of the present invention.
Figure 3B:
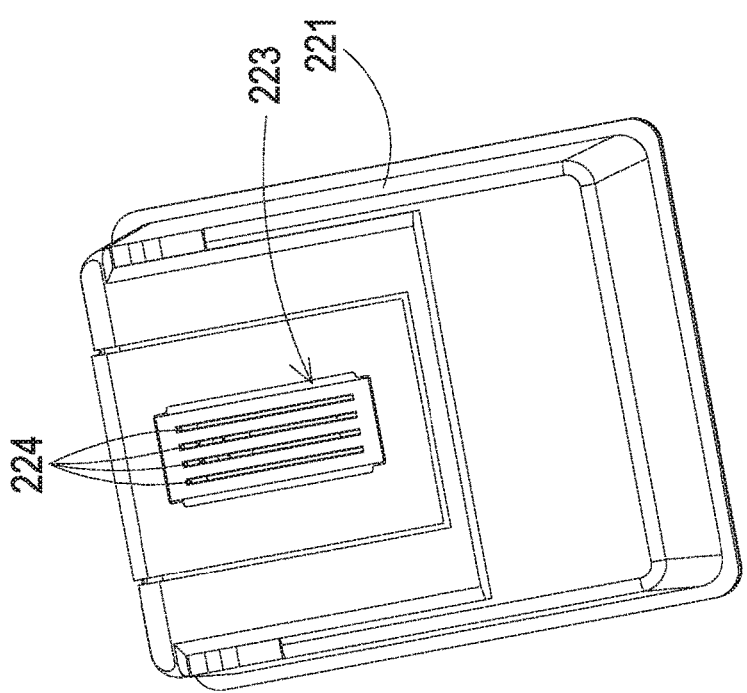
FIG. 3B is a schematic bottom view illustrating the ink cartridge of 3A.
Figure 3C:
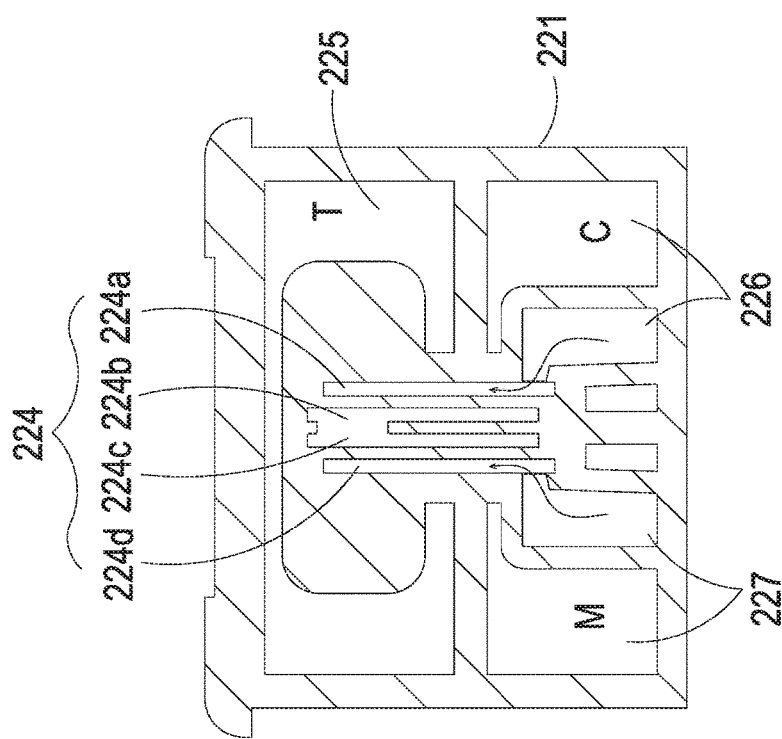
FIG. 3C is a schematic cross-sectional view illustrating the ink cartridge of 3A.

FIG. 3A is a schematic perspective view illustrating an ink cartridge of the printing module of the rapid prototyping apparatus according to the first embodiment of the present invention. FIG. 3B is a schematic bottom view illustrating the ink cartridge of FIG. 3A. FIG. 3C is a schematic cross-sectional view illustrating the ink cartridge of FIG. 3A. As shown in FIGS. 2 and 3A, the ink cartridge 22 of the printing module 2 includes a top cover 220, a case body 221, a flexible circuit board 222 and an inkjet chip 223. The top cover 220 is configured to cover the top of the case body 221. The inkjet chip 223 is disposed on the bottom of the case body 221. The case body 221 has an inner accommodation space for containing the print liquids. The case body 221 has a wall 221a, and the wall 221 of the case body 221 is disposed and corresponding to the carrying seat 21 (as shown in FIG. 2) while the ink cartridge 22 is installed on the rapid prototyping apparatus (not shown). The flexible circuit board 222 is disposed on the wall 221a and has a plurality of electrical contact points 222a. When the ink cartridge 22 is installed on the carrying seat 21 of the rapid prototyping apparatus, the ink cartridge 22 is electrically connected to the corresponding conductive parts (not shown) of the carrying seat 21 by the electrical contact points 222a of the flexible circuit board 222. Moreover, the ink cartridge 22 include an identification chip 229 configured to recognize, control and/or monitor a communication of signals transmitted between the rapid prototyping apparatus and the inkjet chip 223 of the ink cartridge 22.

As shown in FIG. 3B, the inkjet chip 223 is correspondingly disposed on the bottom of the case body 221 of the ink cartridge 22 and has a plurality of liquid supply slots 224. Preferably but not exclusively, the number of the liquid supply slots 224 is 4. Alternatively, in some embodiments, there are three liquid supply slots 224. The number of the liquid supply slots 224 is not limited to the above embodiments, and can be adjustable according the practical requirement. In the embodiment, as shown in FIG. 3C, the case body 221 of the ink cartridge 22 has three ink chambers 225, 226, 227 therein. Namely, the inner accommodation space of the case body 221 is divided into three ink chambers 225, 226, 227 for receiving different print liquids with different colors or same colors, respectively. For example, the ink chamber 225, the ink chamber 226 and the ink chamber 227 are configured to contain but not limited to a transparent binder (T), a cyan (C) ink and a magenta (M) ink, respectively. Three ink chambers 225, 226, 227 are connected to and in fluid communication with the plural liquid supply slots 224 of the inkjet chip 223 disposed on the bottom of the case body 221. In the embodiment, the ink chamber 225 is connected to and in fluid communication with the central two liquid supply slots 224b, 224c for introducing the transparent binder into the central two liquid supply slots 224b, 224c. The ink chamber 226 is connected to and in fluid communication with a lateral liquid supply slot 224a for introducing the cyan ink into the liquid supply slot 224a. The ink chamber 227 is connected to and in fluid communication with another lateral liquid supply slot 224d for introducing the magenta ink into the liquid supply slot 224d.

Figure 4B:
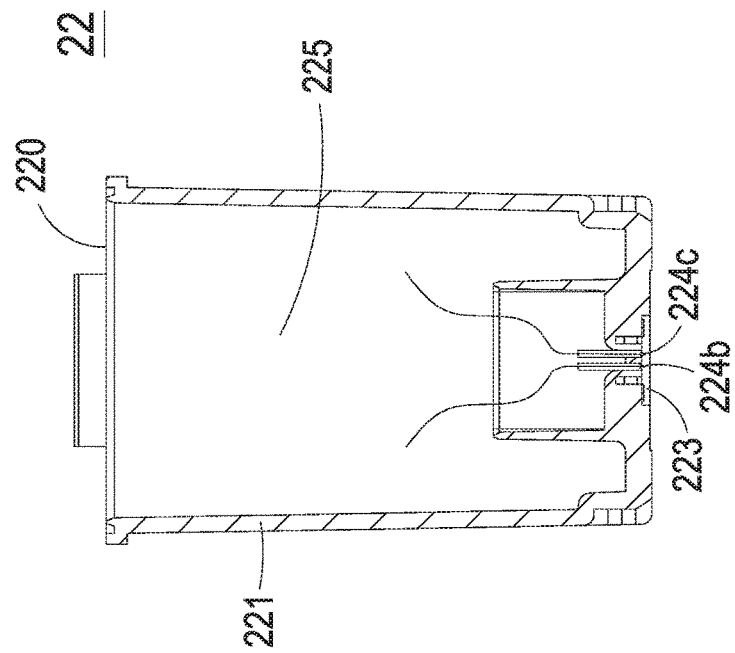
FIG. 4B is a cross-sectional view illustrating the ink cartridge of FIG. 4A and taken along line A-A'.
Figure 4A:
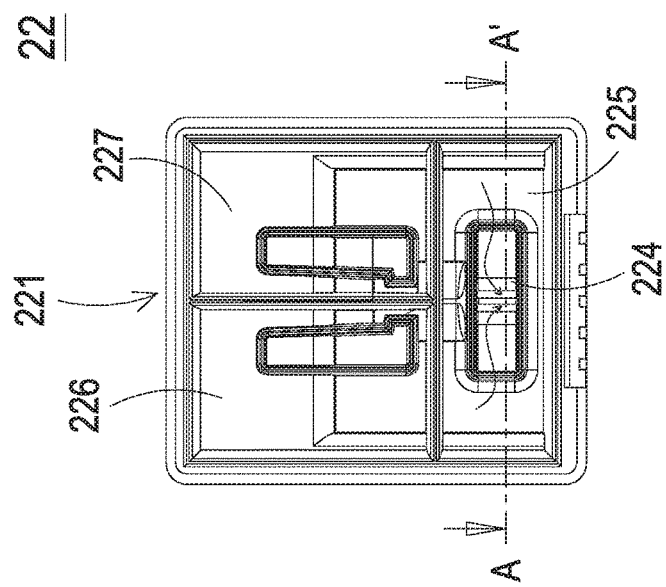
FIG. 4A is a schematic top and cross-sectional view illustrating the ink cartridge of the printing module of the rapid prototyping apparatus according to the first embodiment of the present invention.

FIG. 4A is a schematic top and cross-sectional view illustrating the ink cartridge of the printing module of the rapid prototyping apparatus according to the first embodiment of the present invention. FIG. 4B is a cross-sectional view illustrating the ink cartridge of FIG. 4A and taken along line A-A'. As shown in FIGS. 4A and 4B, the case body 221 of the ink cartridge 22 has three ink chambers 225, 226, 227 connected to and in fluid communication with the plural liquid supply slots 224 of the inkjet chip 223 disposed on the bottom of the case body 221, respectively. According to the cross-sectional view of the ink chamber 225 of FIG. 4B and the cross-sectional view of FIG. 4A, the transparent binder contained in the ink chamber 225 flows from two sides to the bottom of the ink chamber 225, and is introduced to the inkjet chip 223 disposed on the bottom of the case body 221, so as to be introduced to the central two liquid supply slots 224b, 224c and outputted for performing a transparent-binder-supplying operation.

Figure 5B:
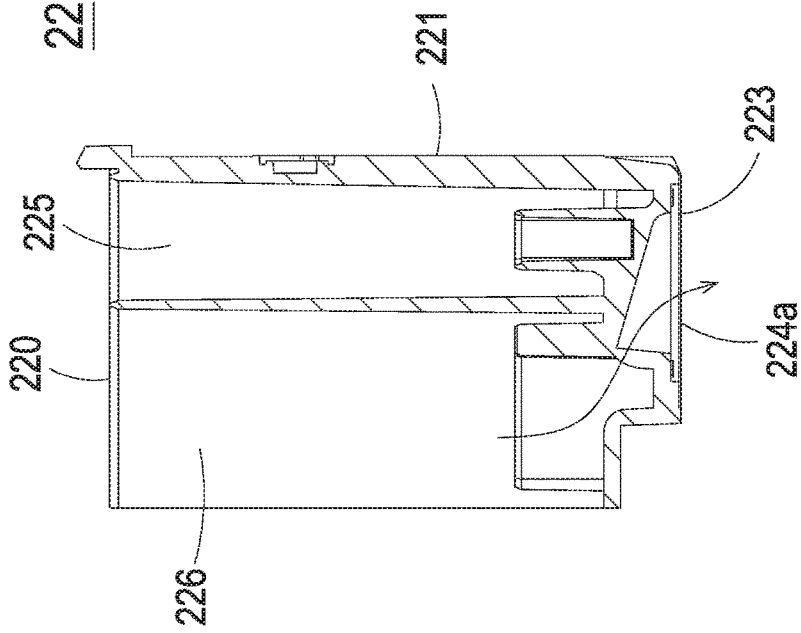
FIG. 5B is a cross-sectional view illustrating the ink cartridge of FIG. 5A and taken along line B-B'.
Figure 5A:
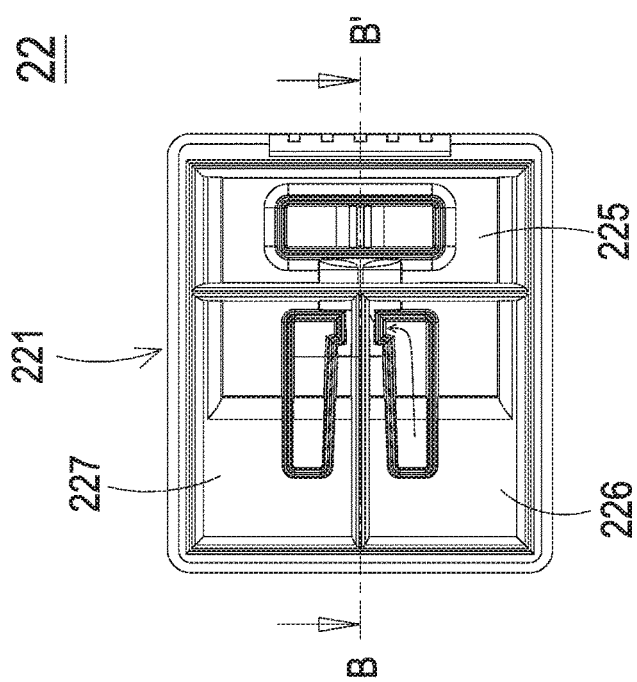
FIG. 5A is another schematic top and cross-sectional view illustrating the ink cartridge of the printing module of the rapid prototyping apparatus according to the first embodiment of the present invention.

FIG. 5A is another schematic top and cross-sectional view illustrating the ink cartridge of the printing module of the rapid prototyping apparatus according to the first embodiment of the present invention. FIG. 5B is a cross-sectional view illustrating the ink cartridge of FIG. 5A and taken along line B-B'. According to the cross-sectional view of the ink chambers 225, 226 of FIG. 5B and the sectional view of FIG. 5A, the cyan ink contained in the ink chamber 226 flows to the bottom of the ink chamber 226, and is introduced to the inkjet chip 223 disposed on the bottom of the case body 221, so as to be introduced to the corresponding liquid supply slot 224*a* and outputted for performing a cyan-inkjet-supplying operation. In the embodiment, the ink chamber 227 is similar to the ink chamber 226, and the ink chamber 226 and the ink chamber 227 are symmetrically disposed within the case body 221. The inner structure and the print liquid flow of the ink chamber 227 are similar to those of the ink chamber 226, and are not redundantly described herein. According to FIGS. 3C, 4A, 4B, 5A and 5B, the ink cartridge 22 has three ink chambers 225, 226, 227 and an inkjet chip 223 having four liquid supply slots 224 cooperating with the three ink chambers 225, 226, 227, so as to introduce two color inks and the transparent binder for producing a three-dimensional physical model by the rapid prototyping printing process.

FIG. 6 is a schematic view illustrating the ink cartridges of the printing module of the rapid prototyping apparatus according to the first embodiment of the present invention. As shown in FIGS. 2 and 6, the at least one ink cartridge 22 includes but not limited to two ink cartridges 22X, 22Y. Each ink cartridge 22X, 22Y has three ink chambers 225*x*, 226*x*, 227*x* and 225*y*, 226*y*, 227*y*, respectively. In the embodiment, the ink chamber 225*x*, the ink chamber 226*x* and the ink chamber 227*x* of the ink cartridge 22X are configured to contain but not limited to the transparent binder (T), a cyan (C) ink and a magenta (M) ink, respectively. Moreover, the ink chamber 225*y*, the ink chamber 226*y* and the ink chamber 227*y* of the ink cartridge 22Y are configured to contain but not limited to the transparent binder (T), a yellow (Y) ink and a black (K) ink, respectively. The plural liquid supply slots 224*x*, 224*y* of the inkjet chips 223*x*, 223*y* disposed on the bottom of the case bodies 221*x*, 221*y* of the ink cartridges 22X, 22Y are connected to and in fluid communication with the corresponding ink chambers 225*x*, 226*x*, 227*x*, 225*y*, 226*y*, 227*y*, respectively. For example in the embodiment, the inkjet chip 223*x* of the ink cartridge 22X has the liquid supply slot 224*ax* configured to be in fluid communication with the ink chamber 226*x* for introducing the cyan ink contained therein, the central two liquid supply slots 224*bx*, 224*cx* configured to be in fluid communication with the ink chamber 225*x* for introducing the transparent binder contained therein, and the liquid supply slot 224*dx* configured to be in fluid communication with the ink chamber 227*x* for introducing the magenta ink contained therein. Moreover, the inkjet chip 223*y* of the ink cartridge 22Y has the liquid supply slot 224*ay* configured to be in fluid communication with the ink chamber 226*y* for introducing the yellow ink contained therein, the central two liquid supply slots 224*by*, 224*cy* configured to be in fluid communication with the ink chamber 225*y* for introducing the transparent binder contained therein, and the liquid supply slot 224*dy* configured to be in fluid communication with the ink chamber 227*y* for introducing the black ink contained therein. Consequently, the ink cartridges 22X, 22Y have different color inks, the black ink and the transparent binder contained therein, so as to perform the polychromatic printing operation for producing a three-dimensional physical model by the rapid prototyping printing process.

Figure 7A:
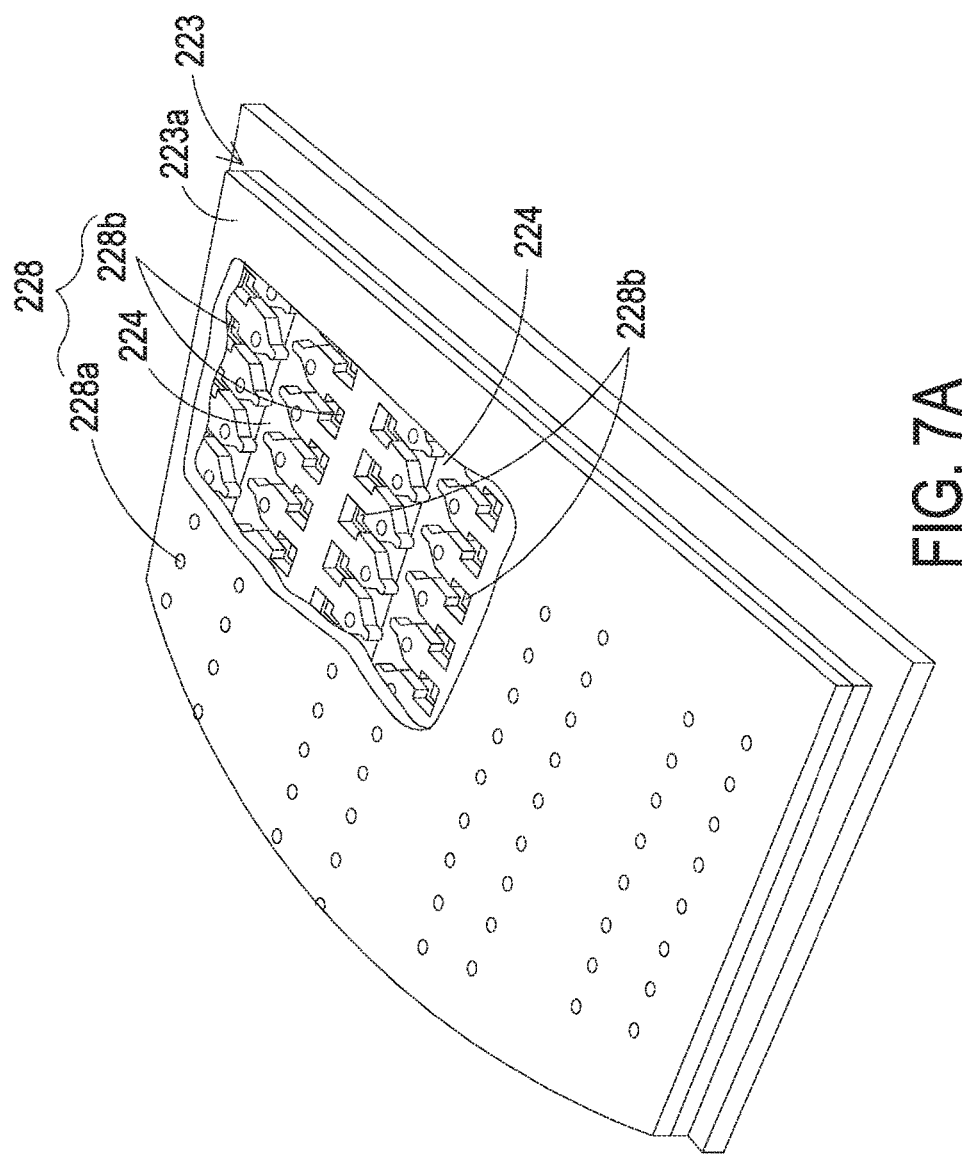
FIG. 7A is a schematic perspective view illustrating an inkjet chip of the ink cartridge of the printing module of the rapid prototyping apparatus according to the first embodiment of the present invention, wherein portion of the nozzle plate is removed.
Figure 7B:
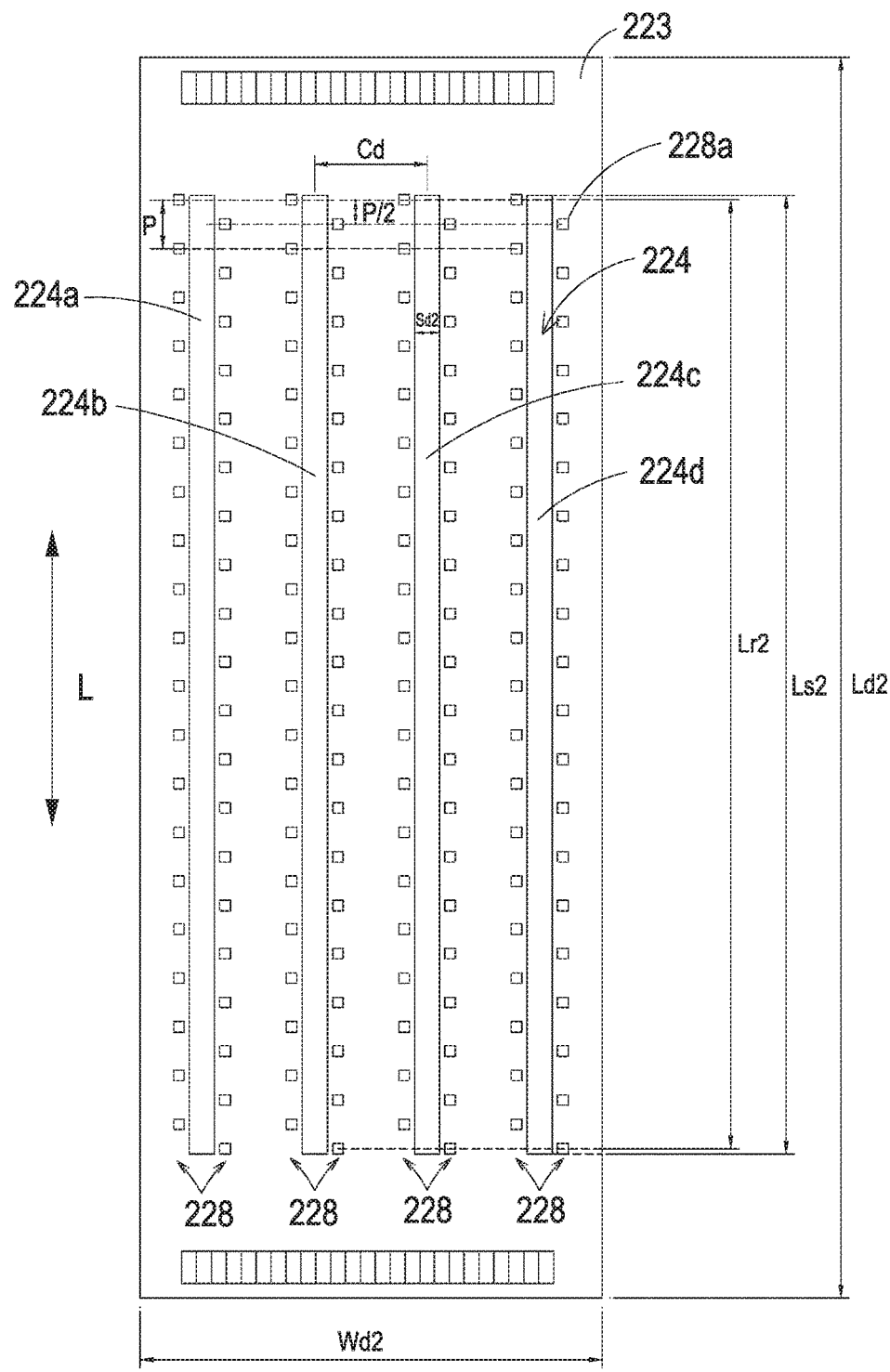
FIG. 7B is a schematic top view illustrating an inkjet chip of the ink cartridge according to the first embodiment of the present invention, wherein the nozzle plate is removed.

FIG. 7A is a schematic perspective view illustrating an inkjet chip of the ink cartridge of the printing module of the rapid prototyping apparatus according to the first embodiment of the present invention, wherein portion of the nozzle plate is removed. FIG. 7B is a schematic top view illustrating an inkjet chip of the ink cartridge according to the first embodiment of the present invention, wherein the nozzle plate is removed. As shown in FIGS. 7A and 7B, the inkjet chip 223 includes a plurality of liquid supply slots 224 disposed thereon. In the embodiment, the number of the liquid supply slots 224 is 4 (i.e. the liquid supply slots 224*a*, 224*b*, 224*c*, 224*d*). Each liquid supply slot 224 includes but not limited to two rows of liquid ejectors 228 located at the bilateral sides of the liquid supply slot 224 along the lateral long axis of the liquid supply slot 224, respectively. The liquid ejectors 228 of each row are in staggered arrangement with respective to the liquid ejectors 228 of other row. Consequently, the inkjet chip 223 of the embodiment includes plural liquid ejectors 228 arranged in 8 rows (i.e. 2 (rows/each liquid supply slot)×4 (liquid supply slots)=8 rows). Each liquid ejector 228 includes a heating resistor 228*b* and a corresponding nozzle 228*a*. The heating resistor 228*b* of the liquid ejector 228 is disposed on the inkjet chip 223 and within a cavity, which is in fluid communication with the liquid supply slot 224 and the ink chambers 225, 226, 227. Moreover, the heating resistor 228*b* disposed within the cavity is sealed by a nozzle plate 223*a*. The nozzles 228*a* are formed in the nozzle plate 223*a* and corresponding to the respective heating resistors 228*b*. When the print liquid is heated by the corresponding heating resistor 228*b*, the print liquid is vaporized and the drop of the print liquid is ejected through the corresponding nozzle 228*a*. Consequently, the printing action of the corresponding liquid ejector 228 is implemented.

In the embodiment, as shown in FIG. 7B, the inkjet chip 223 includes four liquid supply slots 224 parallel to a referring axis L. The liquid supply slots 224 are separated apart along the vertical direction of the referring axis L. The heating resistors 228*b* are arranged along the referring axis in two rows and disposed at the bilateral sides of the corresponding liquid supply slot 224 in staggered arrangement. Consequently, each inkjet chip 223 of the embodiment includes plural heating resistors 228*b* arranged in 8 rows. The number of the heating resistors 228*b* of each row is 300 or more than 300, and the total number of the heating resistors 228*b* is up to 2400, but it is not limited thereto. Any two adjacent heating resistors 228*b* in the same row have a distance P. Any two adjacent heating resistors 228*b* in the different rows have a vertical distance P/2. In some embodiments, the distance P is ranged from 1/600 inch to 1/1200 inch, and the vertical distance P/2 is ranged from 1/1200 inch to 1/2400 inch. In the embodiment, preferably but not exclusively, the distance P is 1/600 inch, and the vertical distance P/2 is 1/1200 inch.

Please refer to FIG. 7B, in the embodiment, the inkjet chip 223 is rectangular structure. The width Wd2 of the inkjet chip 223 is ranged from 5 mm to 7 mm, and perfectly implemented at 6 mm. The length Ld2 of the inkjet chip 223 is about 15.4 mm. The total area of the inkjet chip 223 is ranged from 77 mm² to 107.8 mm². The aspect ratio (Ld2/Wd2) is ranged from 15.4/5 (i.e. 3.08) to 15.4/7 (i.e. 2.2), and perfectly implemented at 15.4/6 (i.e. 2.56). Consequently, the total length Lr2 of the heating resistors 228*b* arranged in a row is about ½ inch. The total number of the liquid ejectors 228 of each inkjet chip 223 is up to 2400. The distributing density of the liquid ejectors 228 disposed on the inkjet chip 223 of the present invention is ranged from 22.2 (i.e. 2400/(15.4×7)=22.2) to 31.16 (i.e. 2400/(15.4×5)=31.16) pieces per mm², and perfectly implemented at 25.9 (i.e. 2400/(15.4×6)=25.9) pieces per mm².

In addition, the width Sd2 of the liquid supply slot 224 is ranged from 0.15 mm to 0.3 mm. The length Ls2 of the liquid supply slot 224 is 12.8 mm. Two adjacent liquid supply slots 224 have a distance Cd about 1.27 mm. The total area of the inkjet chip 223 excluding the located area of four liquid supply slots is equal to a wiring area of the inkjet chip 223 for disposing inner circuits.

In accordance with an aspect of the present invention, the ratio of the wiring area to the total area of the inkjet chip 223 is accounted by the following equation:

((Total area of the inkjet chip 223)–(Located area of the liquid supply slots 224 without wiring))/ (Total area of the inkjet chip 223).

In the embodiment, the inkjet chip 223 includes 4 liquid supply slots 224 disposed thereon. The ratio is equal to ((Length Ld2 of the inkjet chip 223×Width Wd2 of the inkjet chip 223)–(Length Ls2 of the liquid supply slot 224×Width Sd2 of the liquid supply slot 224×4 liquid supply slots 224))/(Length Ld2 of the inkjet chip 223×Width Wd2 of the inkjet chip 223).

In some embodiments, the width Wd2 of the inkjet chip 223 is about 5 mm, and the length Ld2 of the inkjet chip 223 is about 15.4 mm. The total area of the inkjet chip 223 is about 77 mm². Moreover, the length Lds of the liquid supply slot 224 is about 12.8 mm, and the width Ls2 of the liquid supply slot 224 is about 0.15 mm. Consequently, the wiring area of the inkjet chip 223 is about 69.32 mm² (i.e. 77–12.8× 0.15×4=69.32) The ratio of the wiring area of the inkjet chip 223 to the total area of the inkjet chip 223 is 90.02% (i.e. 69.32 mm²/77 mm²=90.02%).

In some embodiments, the width Wd2 of the inkjet chip 223 is about 5 mm, and the length Ld2 of the inkjet chip 223 is about 15.4 mm. The total area of the inkjet chip 223 is about 77 mm². Moreover, the length Lds of the liquid supply slot 224 is about 12.8 mm, and the width Ls2 of the liquid supply slot 224 is about 0.3 mm. Consequently, the wiring area of the inkjet chip 223 is about 61.64 mm² (i.e. 77–12.8× 0.3×4=61.61). The ratio of the wiring area of the inkjet chip 223 to the total area of the inkjet chip 223 is 80.05% (i.e. 61.64 mm²/77 mm²=80.05%), which is the minimum ratio.

In some embodiments, the width Wd2 of the inkjet chip 223 is about 7 mm, and the length Ld2 of the inkjet chip 223 is about 15.4 mm. The total area of the inkjet chip 223 is about 107.8 mm². Moreover, the length Lds of the liquid supply slot 224 is about 12.8 mm, and the width Ls2 of the liquid supply slot 224 is about 0.15 mm. Consequently, the wiring area of the inkjet chip 223 is about 100.12 mm² (i.e. 107.8–12.8×0.15×4=100.12). The ratio of the wiring area of the inkjet chip 223 to the total area of the inkjet chip 223 is 92.87% (i.e. 100.12 mm²/107.8 mm²=92.87%), which is the maximum ratio.

In some embodiments, the width Wd2 of the inkjet chip 223 is about 7 mm, and the length Ld2 of the inkjet chip 223 is about 15.4 mm. The total area of the inkjet chip 223 is about 107.8 mm². Moreover, the length Lds of the liquid supply slot 224 is about 12.8 mm, and the width Ls2 of the liquid supply slot 224 is about 0.3 mm. Consequently, the wiring area of the inkjet chip 223 is about 92.44 mm² (i.e. 107.8–12.8×0.3×4=92.44). The ratio of the wiring area of the inkjet chip 223 to the total area of the inkjet chip 223 is 85.75% (i.e. 92.44 mm²/107.8 mm²=85.75%).

According to the above descriptions, the ratio of the wiring area to the total area of the inkjet chip 223 having 4 liquid supply slots of the present invention is ranged from 80.05% to 92.87%.

When the unwiring area of the inkjet chip 223 (i.e. the located area of the liquid supply slots 224) is fixed, the total area of the inkjet chip 223 can be decreased by means of reducing the circuit layout area and contacting points of the inkjet chip 223 (i.e. the distribution area of the inkjet chip 223). Consequently, the entire size of the inkjet chip 223 is minimized and the cost for producing the structure of the inkjet chip 223 is reduced.

Figure 8:
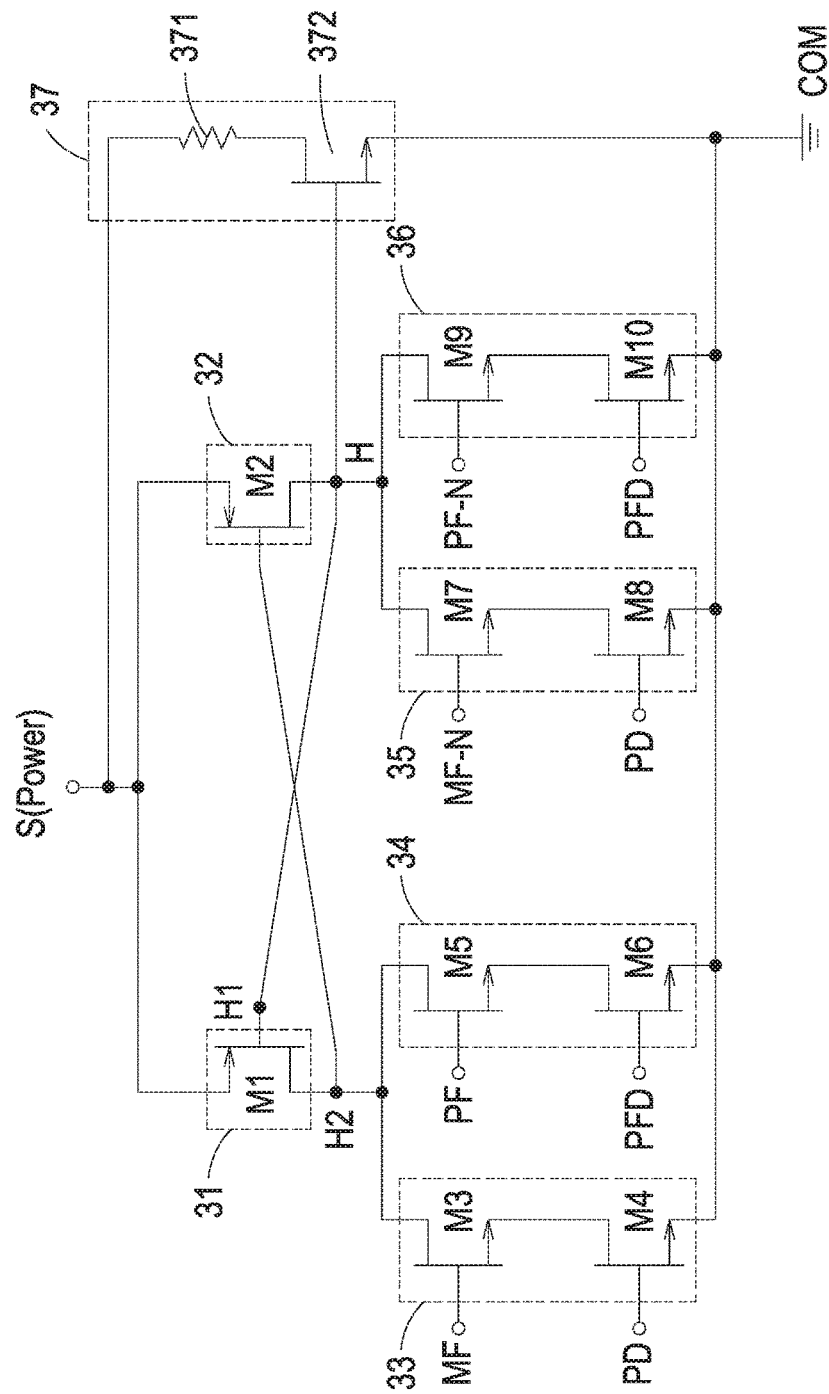
FIG. 8 is a schematic view illustrating a control circuit of the inkjet chip of the ink cartridge of the printing module of the rapid prototyping apparatus according to the first embodiment of the present invention.

FIG. 8 is a schematic view illustrating a control circuit of the inkjet chip of the ink cartridge of the printing module of the rapid prototyping apparatus according to the first embodiment of the present invention. As mentioned in the above description, the inkjet chip 223 has a plurality of nozzles 228a. Each nozzle 228a is corresponding to a liquid ejector 37. Each liquid ejector 37 has a control circuit configured to control the liquid ejector 37 and determine if the liquid ejector 37 has to perform an ejecting operation. Because each nozzle 228a is implemented to eject the drop, and the inkjet chip 223 has a plurality of control circuits corresponding to respective liquid ejectors 37. The control circuit is examped but not limited to the following descriptions.

As shown in FIG. 8, the control circuit of the present invention is implemented in the inkjet chip 223 of the ink cartridge 22 to receive a power signal, a printing data signal PD, a preheating data signal PFD, a preheating control signal PF, a reverse preheating control signal PF-N, a heating control signal MF, and a reverse heating control signal MF-N, and the control circuit is connected with the common connection node COM. Consequently, a part of print liquids and the inkjet chip are preheated or a part of print liquids is heated for generating a bubble and ejecting the print liquids through the nozzles 228a of the inkjet chip 223. The preheating data signal PF is an inversed signal of the reverse preheating control signal PF-N. The heating control signal MF is an inverted signal of the reverse heating control signal MF-N. In some embodiments, two inverter (not shown) can be employed to invert the preheating control signal PF and the heating control signal MF into the reverse preheating control signal PF-N and the reverse heating control signal MF-N, respectively.

The control circuit 3 of the present invention includes a first switch circuit 31, a second switch circuit 32, a third switch circuit 33, a fourth switch circuit 34, a fifth switch circuit 35, a sixth switch circuit 36 and a liquid ejector 37. The liquid ejector 37 includes a heating resistor 371 and a driving transistor 372. The heating resistor 371 has an input terminal to receive the power signal and an output terminal connected to an input terminal of the driving transistor 372. The driving transistor 372 has an output terminal connected to the common connection node COM, and a control terminal connected to a heating control node H. Consequently, the liquid ejector 37 is controlled according to the heating control node H for determining if the liquid ejector 37 has to perform a heating or preheating operation. When the heating control node H receives high voltage signal, the driving transistor 372 is turned on and the heating resistor 371 will receive the power signal from the power terminal S, so as to perform the heating or preheating operation.

The second control circuit 32 is connected between the power terminal S and the heating control node H, and has a second switch element M2, which includes but not limited to MOS transistor or BJT transistor. The second control circuit 32 can be constituted by a plurality of switch elements connected in parallel. The second switch circuit 32 has a control terminal connected to a second control node H2. Consequently, the second switch circuit 32 is controlled according to the second control node H2 for determining if the second switch circuit 32 is turned on. When the second switch circuit 32 receives low voltage signal from the second control node H2, the second switch circuit 32 is turned on and the power signal is transmitted from the power terminal S to the heating control node H (i.e. the output terminal). The second switch element M2 has a gate terminal, a drain terminal and a source terminal. The source terminal (i.e. the input terminal) is connected to the power terminal S for receiving the power signal, the drain terminal (i.e. the output terminal) is connected to the heating control node H, and the gate terminal is connected to the second control node H2.

The first switch circuit 31 is connected between the power terminal S and the second control node H2 of the second control switch circuit 32, and has a first switch element M1, which includes but not limited to MOS transistor or BJT transistor. The first control circuit 31 can be constituted by a plurality of switch elements connected in parallel. The first switch circuit 31 has a control terminal connected to a first control node H1 and connected to the heating control node H. Consequently, the first switch circuit 31 is controlled according to the first control node H1 for determining if the first switch circuit 31 is turned on. When the first switch circuit 31 receives low voltage signal from the first control node H1, the first switch circuit 31 is turned on and the power signal is transmitted from the power terminal S to the second control node H2 (i.e. the output terminal). The first switch element M1 has a gate terminal, a drain terminal and a source terminal. The source terminal (i.e. the input terminal) of the first switch element M1 is connected to the power terminal S for receiving the power signal, the drain terminal (i.e. the output terminal) of the first switch element M1 is connected to the gate terminal (i.e. the control terminal) of the second switch element M2, and the gate terminal of the first switch element M1 is connected to the heating control node H.

The third switch circuit 33 is connected between the second control node H2 and the common connection node COM. The third switch circuit 33 has a third switch element M3 and a fourth switch element M4 in series. The control terminals of the third switch element M3 and the fourth switch element M4 are connected to receive the heating control signal MF and the print data signal PD, respectively. Consequently, the third switch circuit 33 is controlled according to the print data signal PD and the heating control signal MF for determining if the third switch circuit 33 is turned on. When the print data signal PD and the heating control signal MF are at high voltage levels, the third switch circuit 33 is turned on. The third switch element M3 and the fourth switch element M4 both have a gate terminal, a drain terminal and a source terminal. The gate terminal (i.e. the control terminal) of the third switch element M3 is connected to receive the heating control signal MF. Consequently, whether the third switch element M3 is turned on is determined by the control of the heating control signal MF. The gate terminal (i.e. the control terminal) of the fourth switch element M4 is connected to receive the print data signal PD. Consequently, whether the fourth switch element M4 is turned on is determined by the control of the print data signal PD. The drain terminal (i.e. the input terminal) of the third switch element M3 is connected to the drain terminal (i.e. the output terminal) of the first switch element Ml. The source terminal (i.e. the output terminal) of the third switch element M3 is connected to the drain terminal (i.e. the input terminal) of the fourth switch element M4. The source terminal (i.e. the output terminal) of the fourth switch element M4 is connected to the common connection node COM.

The fourth switch circuit 34 is connected between the second control node H2 and the common connection node COM. The fourth switch circuit 34 has a fifth switch element M5 and a sixth switch element M6 in series. The control terminals of the fifth switch element M5 and the sixth switch element M6 are connected to receive the preheating control signal PF and the preheating data signal PFD, respectively. Consequently, the fourth switch circuit 34 is controlled according to the preheating control signal PF and the preheating data signal PFD for determining if the fourth switch circuit 34 is turned on. When the preheating control signal PF and the preheating data signal PFD are at high voltage levels, the fourth switch circuit 34 is turned on. The fifth switch element M5 and the sixth switch element M6 both have a gate terminal, a drain terminal and a source terminal. The gate terminal (i.e. the control terminal) of the fifth switch element M5 is connected to receive the preheating control signal PF. Consequently, whether the fifth switch element M5 is turned on is determined by the control of the preheating control signal PF. The gate terminal (i.e. the control terminal) of the sixth switch element M6 is connected to receive the preheating data signal PFD. Consequently, whether the sixth switch element M6 is turned on is determined by the control of the preheating data signal PFD. The drain terminal (i.e. the input terminal) of the fifth switch element M5 is connected to the drain terminal (i.e. the output terminal) of the first switch element M1. The source terminal (i.e. the output terminal) of the fifth switch element M5 is connected to the drain terminal (i.e. the input terminal) of the sixth switch element M6. The source terminal (i.e. the output terminal) of the sixth switch element M6 is connected to the common connection node COM.

The fifth switch circuit 35 is connected between the heating control node H and the common connection node COM. The fifth switch circuit 35 has a seventh switch element M7 and an eighth switch element M8 in series. The control terminals of the seventh switch element M7 and the eighth switch element M8 are connected to receive the reverse heating control signal MF-N and the print data signal PD, respectively. Consequently, the fifth switch circuit 35 is controlled according to the reverse heating control signal MF-N and the print data signal PD for determining if the fifth switch circuit 35 is turned on. When the reverse heating control signal MF-N and the print data signal PD are at high voltage levels, the fifth switch circuit 35 is turned on. The seventh switch element M7 and the eighth switch element M8 both have a gate terminal, a drain terminal and a source terminal. The gate terminal (i.e. the control terminal) of the seventh switch element M7 is connected to receive the reverse heating control signal MF-N. Consequently, whether the seventh switch element M7 is turned on is determined by the control of the reverse heating control signal MF-N. The gate terminal (i.e. the control terminal) of the eighth switch element M8 is connected to receive the print data signal PD. Consequently, whether the eighth switch element M8 is turned on is determined by the control of the print data signal PD. The drain terminal (i.e. the input terminal) of the seventh switch element M7 is connected to the drain terminal (i.e. the output terminal) of the second switch element M2. The source terminal (i.e. the output terminal) of the seventh switch element M7 is connected to the drain terminal (i.e. the input terminal) of the eighth switch element M8. The source terminal (i.e. the output terminal) of the eighth switch element M8 is connected to the common connection node COM.

The sixth switch circuit 36 is also connected between the heating control node H and the common connection node COM. The sixth switch circuit 36 has a ninth switch element M9 and a tenth switch element M10 in series. The control terminals of the ninth switch element M9 and the tenth switch element M10 are connected to receive the reverse preheating control signal PF-N and the preheating data signal PFD, respectively. Consequently, the sixth switch circuit 36 is controlled according to the reverse preheating control signal PF-N and the preheating data signal PFD for determining if the sixth switch circuit 36 is turned on. When the reverse preheating control signal PF-N and the preheating data signal PFD are at high voltage levels, the sixth switch circuit 36 is turned on. The ninth switch element M9 and the tenth switch element M10 both have a gate terminal, a drain terminal and a source terminal. The gate terminal (i.e. the control terminal) of the ninth switch element M9 is connected to receive the reverse preheating control signal PF-N. Consequently, whether the ninth switch element M9 is turned on is determined by the control of the reverse preheating control signal PF-N. The gate terminal (i.e. the control terminal) of the tenth switch element M10 is connected to receive the preheating data signal PFD. Consequently, whether the tenth switch element M10 is turned on is determined by the control of the preheating data signal PFD. The drain terminal (i.e. the input terminal) of the ninth switch element M9 is connected to the drain terminal (i.e. the output terminal) of the second switch element M2. The source terminal (i.e. the output terminal) of the ninth switch element M9 is connected to the drain terminal (i.e. the input terminal) of the tenth switch element M10. The source terminal (i.e. the output terminal) of the tenth switch element M10 is connected to the common connection node COM.

According to the above descriptions, when the preheating control signal PF and the preheating data signal PFD are at high voltage levels and the reverse preheating control signal PF-N is at low voltage level, the sixth switch circuit 36 is turned off, the second switch circuit 32 is controlled by the control signal transmitted from the output terminal of the first switch circuit 31 and the fourth switch circuit 34 is turned on, so that the power signal is transmitted to the heating resistor 371 from the second switch circuit 32 and the heating resistor 371 preheats a part of the print liquid (i.e. print ink) and the inkjet chip 223.

When the print data signal PD and the heating control signal MF are at high voltage levels, and the reverse heating control signal MF-N is at low voltage level, the fifth switch circuit 35 is turned off, the second switch circuit 32 is controlled by the control signal transmitted from the output terminal of the first switch circuit 31 and the third switch circuit 33 is turned on, so that the power signal is transmitted to the heating resistor 371 from the second switch circuit 32 and the heating resistor 371 heats a part of the print ink to generate a bubble and eject the print ink through the nozzle 228a of the inkjet chip 223.

Alternatively, the above switch elements ranged from the third switch element M3 to the tenth switch element M10 can include but not limited to MOS transistor or BJT transistor. Any electronic component capable of achieving the same purpose and effect is included in the disclosed scope of the present invention.

When a printing operation is performed by the printing module 2 of the rapid prototyping apparatus (not shown), the liquid ejector 37 is controlled by means of transmitting the power signal, the printing data signal PD, the heating control signal MF and the preheating control signal PF to the control circuit 3 of the inkjet chip 233 of the ink cartridge 22, so as to perform a heating or preheating operation. Even though the printing operation is not performed, the preheating operation can be performed to warm up and keep the temperature of the inkjet chip 233 for assuring the print quality. Moreover, the efficiency of controlling the preheating temperature is improved and the printing speed is enhanced.

Figures 9A, 9B:
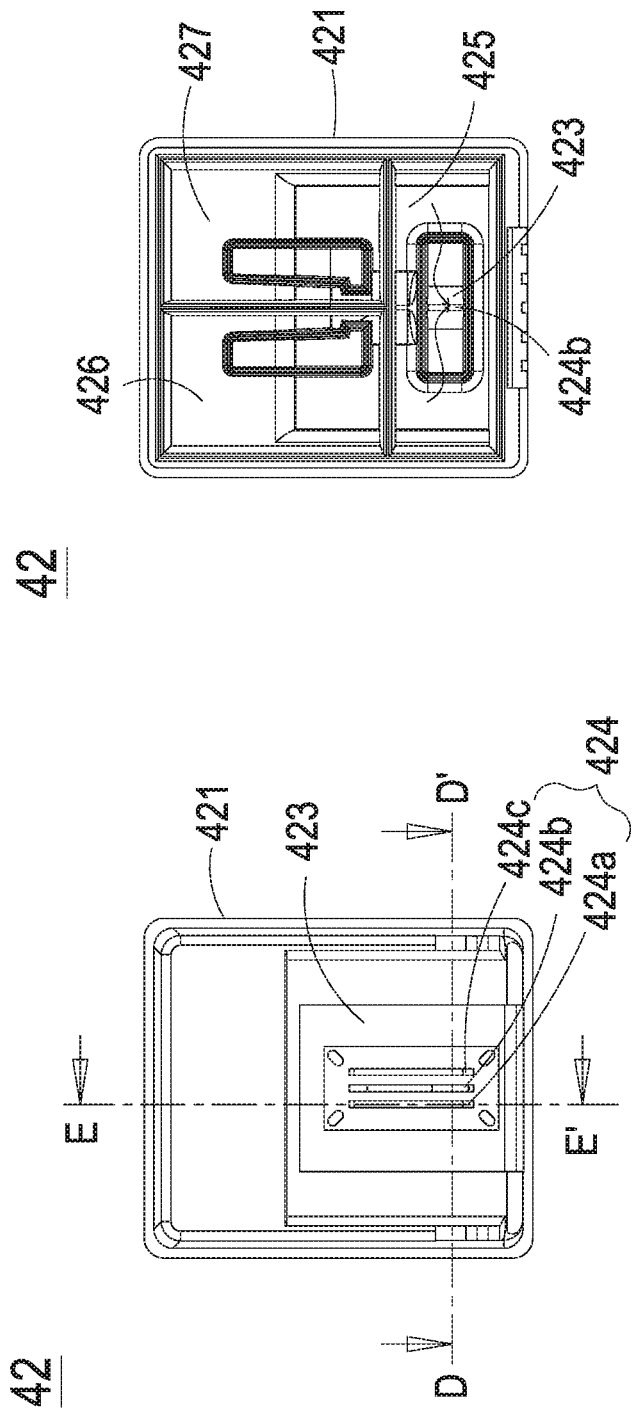
FIG. 9A is a schematic bottom view illustrating the ink cartridge according to a second embodiment of the present invention.
FIG. 9B is a schematic top and cross-sectional view illustrating the ink cartridge of FIG. 9A.
Figure 9C:
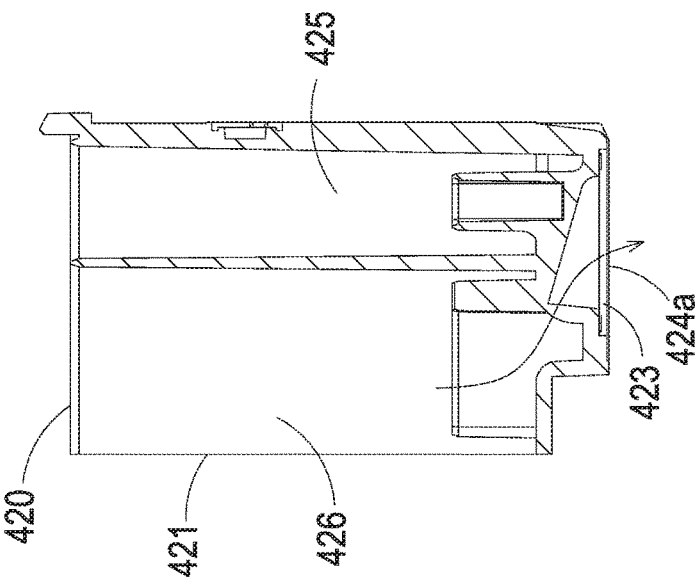
FIG. 9C is a cross-sectional view illustrating the ink cartridge of FIG. 9A and taken along line D-D'.
Figure 9D:
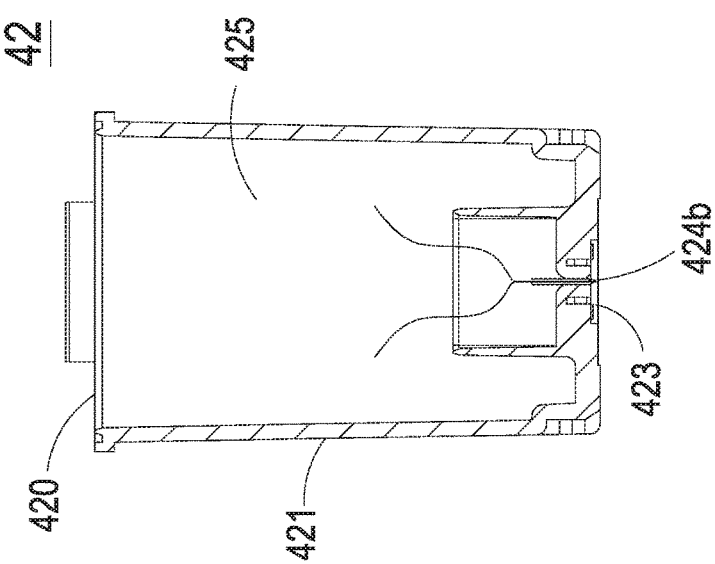
FIG. 9D is a cross-sectional view illustrating the ink cartridge of FIG. 9A and taken along line E-E'.

Please refer to FIGS. 9A, 9B, 9C and 9D. FIG. 9A is a schematic bottom view illustrating the ink cartridge according to a second embodiment of the present invention. FIG. 9B is a schematic top and cross-sectional view illustrating the ink cartridge of FIG. 9A. FIG. 9C is a cross-sectional view illustrating the ink cartridge of FIG. 9A and taken along line D-D'. FIG. 9D is a cross-sectional view illustrating the ink cartridge of FIG. 9A and taken along line E-E'. As shown in FIGS. 9A and 9B, the structure of the ink cartridge 42 is similar to the above embodiment. The case body 421 of the ink cartridge 42 has three ink chambers 425, 426, 427 and the ink cartridge 42 includes an inkjet chip 423 disposed on the bottom of the case body 421. In the embodiment, the number of the liquid supply slots 424 included in the inkjet chip 423 is different from that of the above embodiment. In the embodiment, preferably but not exclusively, the number of the liquid supply slots 424 is 3.

Figure 10:
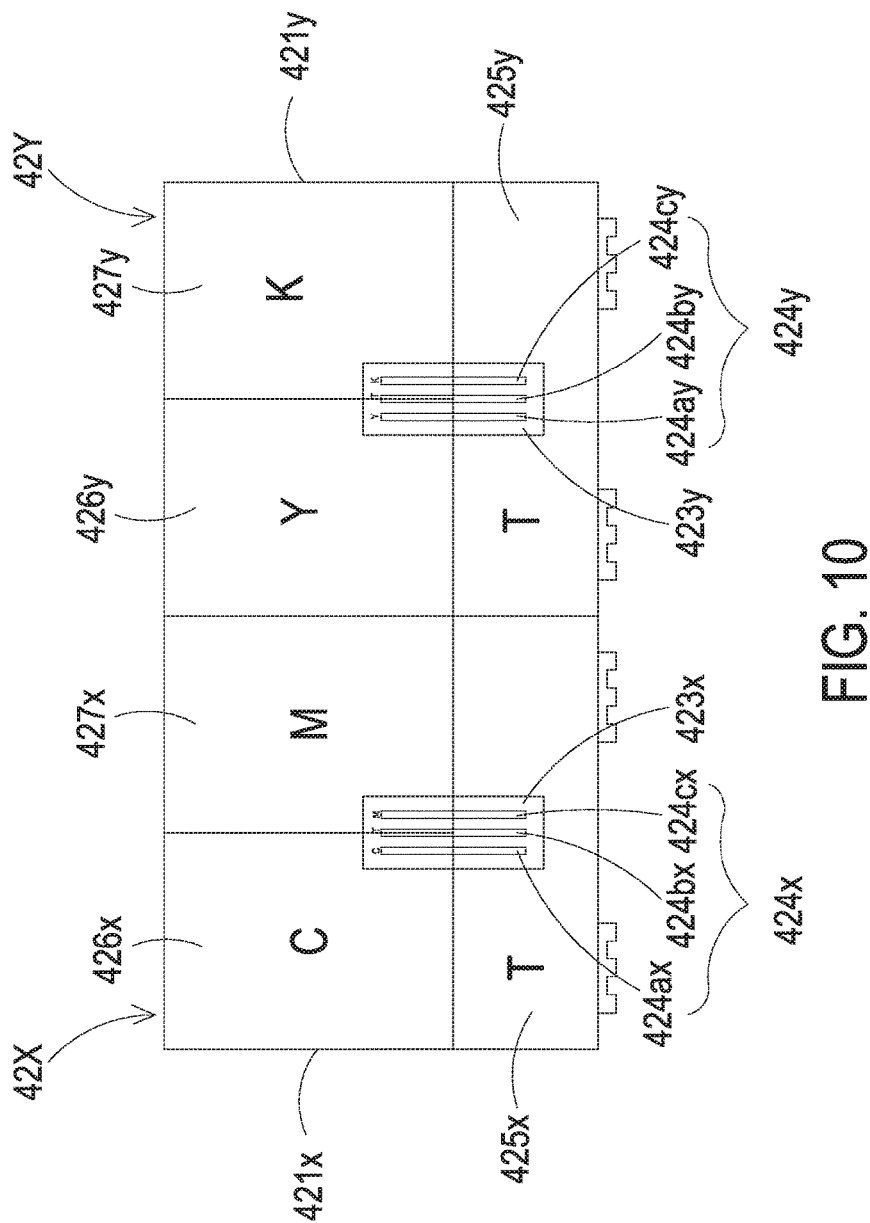
FIG. 10 is a schematic view illustrating the ink cartridges of the printing module of the rapid prototyping apparatus according to the second embodiment of the present invention.

As shown in FIGS. 9B and 10, in the embodiment, the ink chamber 425, the ink chamber 426 and the ink chamber 427 of the case body 421 of the ink cartridge 42 are configured to contain but not limited to a transparent binder (T), a cyan (C) ink, and a magenta (M) ink, respectively. Three ink chambers 425, 426, 427 are connected to and in fluid communication with the plural liquid supply slots 424 of the inkjet chip 423 disposed on the bottom of the case body 421. As shown in FIGS. 9B and 9C, the transparent binder contained in the ink chamber 425 flows from two sides to the bottom of the ink chamber 425, and is introduced to the inkjet chip 423 disposed on the bottom of the case body 421, so as to be introduced to the central liquid supply slot 424b and outputted for performing a transparent-binder-supplying operation.

As shown in FIG. 9D, the cyan ink contained in the ink chamber 426 flows to the bottom of the ink chamber 426, and is introduced to the inkjet chip 423 disposed on the bottom of the case body 421, so as to be introduced to the corresponding liquid supply slot 424a and outputted for performing a cyan-inkjet-supplying operation. In the embodiment, the inner structure of the ink chamber 427 is similar to that of the ink chamber 426, and the ink chamber 427 and the ink chamber 426 are symmetrically disposed within the case body 421. The ink flow of the ink chamber 427 is similar to that of the ink chamber 426, and is not redundantly described herein.

FIG. 10 is a schematic view illustrating the ink cartridges of the printing module of the rapid prototyping apparatus according to the second embodiment of the present invention. As shown in FIG. 10, the at least two ink cartridges 42 include but not limited to two ink cartridges 42X, 42Y. Each ink cartridge 42X, 42Y has three ink chambers 425x, 426x, 427x and 425y, 426y, 427y, respectively. In the embodiment, the ink chamber 425x, the ink chamber 426x and the ink chamber 427x of the ink cartridge 42X are configured to contain but not limited to the transparent binder (T), a cyan (C) ink and a magenta (M) ink, respectively. Moreover, the ink chamber 425y, the ink chamber 426y and the ink chamber 427y of the ink cartridge 42Y are configured to contain but not limited to the transparent binder (T), a yellow (Y) ink and a black (K) ink, respectively. The plural liquid supply slots 424x, 424y of the inkjet chips 423x, 423y disposed on the bottom of the case bodies 421x, 421y of the ink cartridges 42X, 42Y are connected to and in fluid communication with the corresponding ink chambers 425x, 426x, 427x, 425y, 426y, 427y, respectively. For example in the embodiment, the inkjet chip 423x of the ink cartridge 42X has the liquid supply slot 424ax configured to be in fluid communication with the ink chamber 426x for introducing the cyan ink contained therein, the central supply slot 424bx configured to be in fluid communication with the ink chamber 425x for introducing the transparent binder contained therein, and the liquid supply slot 424cx configured to be in fluid communication with the ink chamber 427x for introducing the magenta ink contained therein. Moreover, the inkjet chip 423y of the ink cartridge 42Y has the liquid supply slot 424ay configured to be in fluid communication with the ink chamber 426y for introducing the yellow ink contained therein, the central liquid supply slot 424by configured to be in fluid communication with the ink chamber 425y for introducing the transparent binder contained therein, and the liquid supply slot 424cy configured to be in fluid communication with the ink chamber 427y for introducing the black ink contained therein. Consequently, the ink cartridges 42X, 42Y have different color inks, the black ink and the transparent binder contained therein, so as to perform the polychromatic printing operation for producing a three-dimensional physical model by the rapid prototyping printing process.

In the embodiment, the ratio of the wiring area to the total area of the inkjet chip 423 is accounted by the following equation:

((Total area of the inkjet chip 423)−(Located area of the liquid supply slots 424 without wiring))/
(Total area of the inkjet chip 423).

In the embodiment, the inkjet chip 423 includes 3 liquid supply slots 424 disposed thereon. The structure and size of the inkjet chip 423 and the liquid supply slots 424 are similar to that of the inkjet chip 223 and the liquid slot 224 shown in FIG. 7B. The ratio is equal to ((Length Ld2 of the inkjet chip 423×Width Wd2 of the inkjet chip 423)−(Length Ls2 of the liquid supply slot 424×Width Sd2 of the liquid supply slots 424×3 liquid supply slots 424))/(Length Ld2 of the inkjet chip 423×Width Wd2 of the inkjet chip 423).

In some embodiments, the width Wd2 of the inkjet chip 423 is about 5 mm, and the length Ld2 of the inkjet chip 423 is about 15.4 mm. The total area of the inkjet chip 423 is about 77 mm$^2$. Moreover, the length Lds of the liquid supply slot 424 is about 12.8 mm, and the width Ls2 of the liquid supply slot 424 is about 0.15 mm. Consequently, the wiring area of the inkjet chip 223 is about 71.24 mm$^2$ (i.e. 77−12.8×0.15×3=71.24). The ratio of the wiring area of the inkjet chip 423 to the total area of the inkjet chip 423 is 92.51% (i.e. 71.24 mm$^2$/77 mm$^2$=92.51%).

In some embodiments, the width Wd2 of the inkjet chip 423 is about 5 mm, and the length Ld2 of the inkjet chip 423 is about 15.4 mm. The total area of the inkjet chip 423 is about 77 mm$^2$. Moreover, the length Lds of the liquid supply slot 424 is about 12.8 mm, and the width Ls2 of the liquid supply slot 424 is about 0.3 mm. Consequently, the wiring area of the inkjet chip 423 is about 65.48 mm$^2$ (i.e. 77−12.8×0.3×3=65.48) The ratio of the wiring area of the inkjet chip 423 to the total area of the inkjet chip 423 is 85.03% (i.e. 65.48 mm$^2$/77 mm$^2$=85.03%), which is the minimum ratio.

In some embodiments, the width Wd2 of the inkjet chip 423 is about 7 mm, and the length Ld2 of the inkjet chip 423 is about 15.4 mm. The total area of the inkjet chip 423 is about 107.8 mm$^2$. Moreover, the length Lds of the liquid supply slot 424 is about 12.8 mm, and the width Ls2 of the liquid supply slot 424 is about 0.15 mm. Consequently, the wiring area of the inkjet chip 423 is about 102.04 mm$^2$ (i.e. 107.8−12.8×0.15×3=102.04). The ratio of the wiring area of the inkjet chip 423 to the total area of the inkjet chip 423 is 94.65% (i.e. 102.04 mm$^2$/107.8 mm$^2$=94.65%), which is the maximum ratio.

In some embodiments, the width Wd2 of the inkjet chip 423 is about 7 mm, and the length Ld2 of the inkjet chip 423 is about 15.4 mm. The total area of the inkjet chip 223 is about 107.8 mm$^2$. Moreover, the length Lds of the liquid supply slot 424 is about 12.8 mm, and the width Ls2 of the liquid supply slot 424 is about 0.3 mm. Consequently, the wiring area of the inkjet chip 423 is about 96.28 mm$^2$ (i.e. 107.8×12.8×0.3×3=96.28). The ratio of the wiring area of the inkjet chip 423 to the total area of the inkjet chip 423 is 89.31% (i.e. 96.28 mm$^2$/107.8 mm$^2$=89.31%).

According to the above descriptions, the ratio of the wiring area to the total area of the inkjet chip 423 having 3 liquid supply slots of the present invention is ranged from 85.03% to 94.65%.

Alternatively, the print liquids contained in the plural ink cartridges 22, 42 may be in fluid communication with the continuous liquid supply device (not shown) of the rapid prototyping apparatus through an external pipe (not shown), so that a continuous liquid supply system is defined.

In summary, the present invention provides a printing module of a rapid prototyping apparatus. The printing module includes the modular ink cartridge having three ink chambers. Two of the ink chambers are configured to receive different color inks, respectively, and one of the ink chambers is configured to receive a liquid binder. Consequently, a rapid prototyping printing process is performed without adjusting the design of the original printing module, and the effects of fixing the size of the original printing module and reducing the printing cost are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inkjet chip used in a printing module of a rapid prototyping apparatus, wherein the printing module includes a printing platform, a carrying seat and at least two modular ink cartridges, and the at least two modular ink cartridges are disposed on the carrying seat, wherein each of the modular ink cartridges has a case body and three ink chambers, the three ink chambers are divided within the case body for receiving different print liquids, respectively, and the case bodies of the at least two modular ink cartridges contain at least one print liquid the same with each other, wherein the inkjet chip is disposed on a bottom of the case body of the modular ink cartridge and has a length and a width to define a total area, the inkjet chip comprising:

an unwiring area having at least three liquid supply slots in parallel with each other and respectively connected to one of the three ink chambers of the modular ink cartridge; and a wiring area having a control circuit, wherein the control circuit includes a plurality of liquid ejectors and each liquid ejector has a heating resistor, a driving transistor and a nozzle, wherein the heating resistors are disposed on the inkjet chip and sealed by a nozzle plate, the nozzles are disposed on the nozzle plate and corresponding to the heating resistors, the plural liquid ejectors are arranged along an axis and disposed at the bilateral sides of the corresponding liquid supply slot in staggered arrangement, and the ratio of the wiring area of the inkjet chip to the total area of the inkjet chip is ranged from 85.03% to 94.65%.

2. The inkjet chip according to claim 1, wherein each inkjet chip includes four liquid supply slots disposed thereon.

3. The inkjet chip according to claim 2, wherein the ratio of the wiring area of the inkjet chip to the total area of the inkjet chip is ranged from 80.05% to 92.87%.

4. The inkjet chip according to claim 1, where any two adjacent liquid supply slots have a distance at 1.27 mm.

5. The inkjet chip according to claim 1, wherein the aspect ratio of the length of the inkjet chip to the width of the inkjet chip is ranged from 2.2 to 3.08.

6. The inkjet chip according to claim 1, wherein the inkjet chip has 2400 liquid ejectors.

7. The inkjet chip according to claim 1, wherein any two adjacent liquid ejectors in different rows have a vertical distance at $1/600$ inch.

8. The inkjet chip according to claim 1, wherein the control circuit is connected to receive a power signal, a printing data signal, a preheating data signal, a preheating control signal, a reverse preheating control signal, a heating control signal, and a reverse heating control signal and connected with a common connection node for controlling the liquid ejector, the heating resistor has an input terminal for receiving the power signal and an output terminal connected with an input terminal of the driving transistor, the driving transistor has an output terminal connected to the common connection node, and the driving transistor is controlled by the control circuit, the control circuit comprises:

a first switch circuit having an input terminal for receiving the power signal and a control terminal connected to the heating resistor;

a second switch circuit having an input terminal for receiving the power signal, an output terminal connected to the heating resistor, and a control terminal connected to the output terminal of the first switch circuit;

a third switch circuit having two control terminals for receiving the heating control signal and the print data signal respectively, an output terminal connected to the common connection node, and an input terminal connected to the input terminal of the first switch circuit and the control terminal of the second switch circuit;

a fourth switch circuit having two control terminals connected to receive the preheating control signal and the preheating data signal respectively, an output terminal connected to the common connection node, and an input terminal connected to the input terminal of the first switch circuit, the control terminal of the second switch circuit and the input terminal of third switch circuit;

a fifth switch circuit having two control terminals connected to receive the reverse heating control signal and the printing data signal, an output terminal connected to the common connection node, and an input terminal connected to the control terminal of the first switch circuit, the output terminal of the second switch circuit, and the control terminal of the liquid ejector; and a sixth switch circuit having two control terminals connected to receive the preheating control signal and the preheating data signal, an output terminal connected to the common connection node and an output terminal connected to the control terminal of the first switch circuit, the output terminal of the second switch circuit and the control terminal of the liquid ejector;

wherein when the preheating control signal and the preheating data signal are at high voltage levels and the reverse preheating control signal is at low voltage level, the sixth switch circuit is turned off, the second switch circuit is controlled by the output terminal of the first switch circuit and the fourth switch circuit is turned on, so that the power signal is transmitted to the heating resistor from the second switch circuit and the heating resistor preheats a part of the print ink and the inkjet chip; and when the print data signal and the heating control signal are at high voltage levels and the reverse heating control signal is at low voltage level, the fifth switch circuit is turned off, the second switch circuit is controlled by the output terminal of the first switch circuit and the third switch circuit is turned on, so that the power signal is transmitted to the heating resistor from the second switch circuit and the heating resistor heats a part of the print ink to generate a bubble and eject the print ink through the nozzle of the inkjet chip.

9. The inkjet chip according to claim 8, wherein the first switch circuit of the control circuit includes a first switch element having a gate terminal, a drain terminal and a source terminal, wherein the source terminal of the first switch element is connected to receive the power signal, the drain terminal of the first switch element is connected to the control terminal of the second switch circuit, and the gate terminal of the first switch element is connected to the heating resistor, so as to determine if the first switch element is turned on by the gate terminal thereof.

10. The inkjet chip according to claim 9, wherein the second switch circuit of the control circuit includes a second switch element having a gate terminal, a drain terminal and a source terminal, wherein the source terminal of the second switch element is connected to receive the power signal, the drain terminal of the second switch element is connected to the control terminal of the heating resistor, and the gate terminal of the second switch element is connected to the drain terminal of the first switch element, so as to determine if the second switch element is turned on by the gate terminal thereof.

11. The inkjet chip according to claim 10, wherein the fifth switch circuit of the control circuit includes a seventh switch element and an eighth switch element in series, and the seventh switch element and the eighth switch element have a gate terminal, a drain terminal and a source terminal, respectively, wherein the gate terminal of the seventh switch element is connected to receive the reverse heating control signal for determining if the seventh switch element is turned on by the control of the reverse heating control signal, the gate terminal of the eighth switch element is connected to receive the print data signal for determining if the eighth switch element is turned on by the control of the print data signal, the drain terminal of the seventh switch element is connected to the drain terminal of the second switch element, the source terminal of the seventh switch element is connected to the drain terminal of the eighth switch element, and the source terminal of the eighth switch element is connected to the common connection node.

12. The inkjet chip according to claim 10, wherein the sixth switch circuit of the control circuit includes a ninth switch element and a tenth switch element in series, and the ninth switch element and the tenth switch element have a gate terminal, a drain terminal and a source terminal, respectively, wherein the gate terminal of the ninth switch element is connected to receive the reverse preheating control signal for determining if the ninth switch element is turned on by the control of the reverse preheating control signal, the gate terminal of the tenth switch element is connected to receive the preheating data signal for determining if the tenth switch element is turned on by the control of the preheating data signal, the drain terminal of the ninth switch element is connected to the drain terminal of the second switch element, the source terminal of the ninth switch element is connected to the drain terminal of the tenth switch element, and the source terminal of the tenth switch element is connected to the common connection node.

13. The inkjet chip according to claim 9, wherein the third switch circuit of the control circuit includes a third switch element and a fourth switch element in series, and the third switch element and the fourth switch have a gate terminal, a drain terminal and a source terminal, respectively, wherein the gate terminal of the third switch element is connected to receive the heating control signal for determining if the third switch element is turned on by the control of the heating control signal, the gate terminal of the fourth switch element is connected to receive the print data signal for determining if the fourth switch element is turned on by the control of the print data signal, the drain terminal of the third switch element is connected to the drain terminal of the first switch element, the source terminal of the third switch element is connected to the drain terminal of the fourth switch element, and the source terminal of the fourth switch element is connected to the common connection node.

14. The inkjet chip according to claim 9, wherein the forth switch circuit of the control circuit includes a fifth switch element and a sixth switch element in series, and the fifth switch element and the sixth switch have a gate terminal, a drain terminal and a source terminal, respectively, wherein the gate terminal of the fifth switch element is connected to receive the preheating control signal for determining if the fifth switch element is turned on by the control of the preheating control signal, the gate terminal of the sixth switch element is connected to receive the preheating data signal for determining if the sixth switch element is turned on by the control of the preheating data signal, the drain terminal of the fifth switch element is connected to the drain terminal of the first switch element, the source terminal of the fifth switch element is connected to the drain terminal of the sixth switch element, and the source terminal of the sixth switch element is connected to the common connection node.

* * * * *